UNITED STATES PATENT OFFICE.

CHARLES CHAUNCY PARSONS, OF HEMPSTEAD, NEW YORK.

INSECTICIDE.

SPECIFICATION forming part of Letters Patent No. 431,528, dated July 1, 1890.

Application filed March 17, 1890. Serial No. 344,184. (No specimens.)

*To all whom it may concern:*

Be it known that I, CHARLES CHAUNCY PARSONS, a citizen of the United States, and a resident of Hempstead, in the county of Queens and State of New York, have invented a new and useful Composition of Matter to be Used for Protecting Plants or Trees from Insects, of which the following is a specification.

My composition consists of the following ingredients, viz: A soap which may be either hard or soft. The strongly-smelling tarry substance which is obtained as a by-product when coal-oil or petroleum or their distillates or derivatives are treated with a strong acid in the process of their purification, and which is generally called "sludge-acid." Sufficient alkali to so neutralize the acid in this substance that it will not decompose the soap or interfere with an intimate and permanent mixture. The alkali had better be in excess than in any deficiency. The mixture may be made by crutching in the sludge when the soap is melted, or in any other convenient way. The mixture must be so uniform and intimate that when it is mixed with water for use it will form an emulsion that may be applied to the trees or plants by the ordinary means of spraying or sprinkling. If desired, the sludge or tarry substance may be diluted with water, and the oily or tarry portion separated from the diluted acid. The acid can be utilized for other purposes, and the tarry portions only mixed with the soap. Less alkali will be needed in this way than when the entire sludge is used. The proportions are not essential, so long as on the one hand enough sludge is used to make the compound sufficiently strongly smelling for the intended use, and on the other hand enough soap is used to form an emulsion that can be used in the ordinary way. I have found in practice that a compound containing equal parts of soap and sludge will give good results, though the proportions may be varied, and the emulsifying properties of the soap may be increased by the addition of starchy, mucilaginous, or glutinous bodies, if desired, though a composition that will form an excellent emulsion can be made with soap and sludge only.

I am aware that kerosene and petroleum have been used in soap and to form emulsion; but the smell is so slight, comparatively, that if enough is used to protect the plants from insects there is danger of injuring the foliage. So much more of the odoriferous portions of the petroleum or coal-oil are concentrated in the sludge that very much less of a soap compounded with it need be used than of one made from petroleum or kerosene.

By careful tests I have found that by the use of my compound the vegetation is more perfectly protected from insects, there is less danger of injuring the foliage, and a much greater economy in its use.

What I claim, and desire to secure by Letters Patent of the United States, is—

1. The herein-described composition of matter to be used for protecting plants from insects, consisting of a soap and the substance obtained by treating coal-oil or petroleum or its derivates or distillates with an acid, and known in the trade as sludge-acid, and sufficient alkali to neutralize the acid, so that it will not decompose the soap, substantially as set forth.

2. The herein-described composition of matter to be used for protecting plants from insects, consisting of a soap and the tarry or oily substance separated from sludge-acid by diluting it with water, and sufficient alkali to neutralize the acid in the oil or tar, substantially as set forth.

3. The herein-described composition of matter, consisting of a soap and the substance obtained by treating coal-oil or petroleum or its derivates or distillates with an acid, and known in the trade as sludge-acid, and sufficient alkali to neutralize the acid, so that it will not decompose the soap, and a starchy, mucilaginous, or glutinuous substance, substantially as set forth.

In testimony that I claim the foregoing as my invention I have signed my name, in presence of two witnesses, this 15th day of March, 1890.

CHARLES CHAUNCY PARSONS.

Witnesses:
W. D. REED,
N. S. H. PIERCY.